Nov. 7, 1972   R. H. WETTERHORN   3,702,141
GAS TYPE SAFETY VALVE
Filed Feb. 22, 1971   4 Sheets-Sheet 1
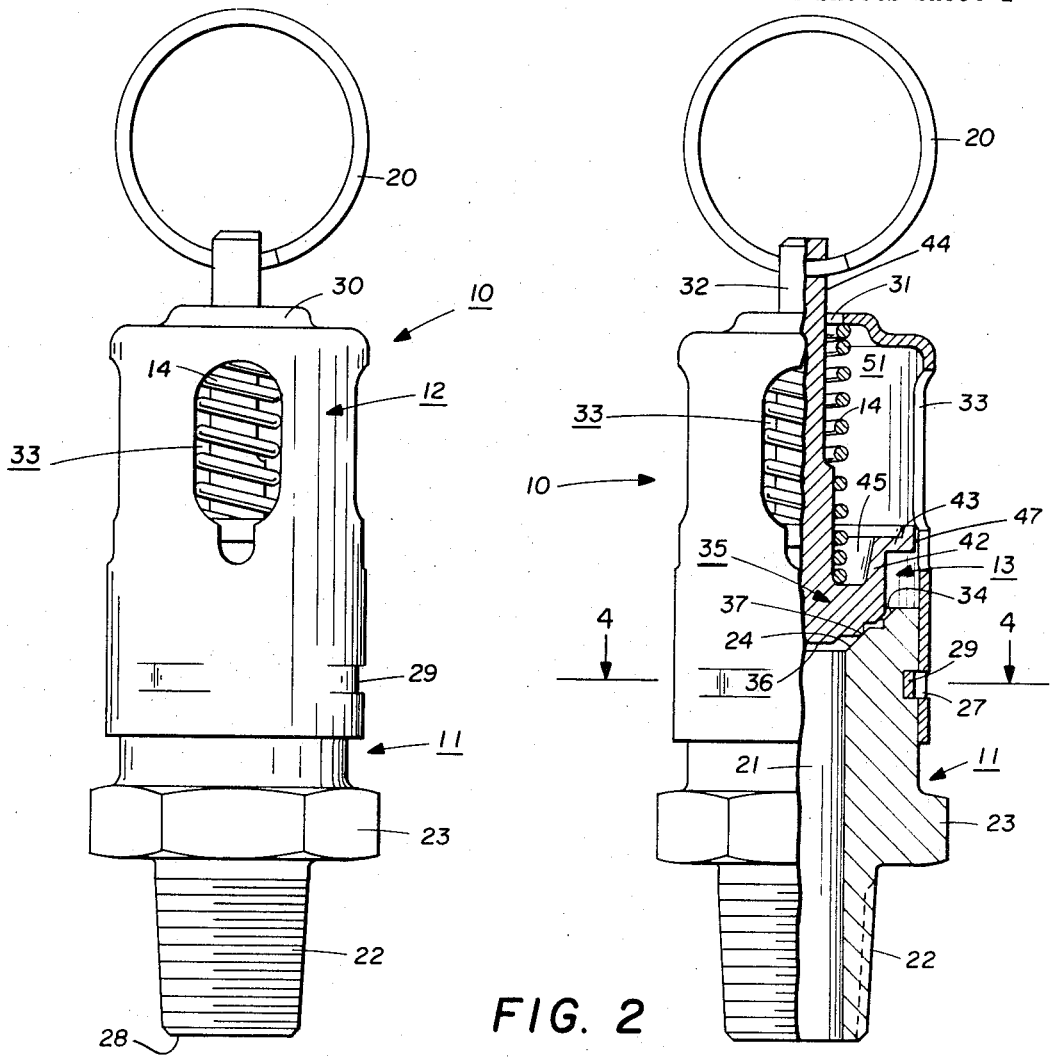
FIG. 1
FIG. 2
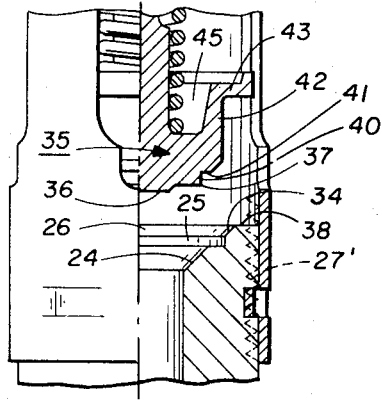
FIG. 3
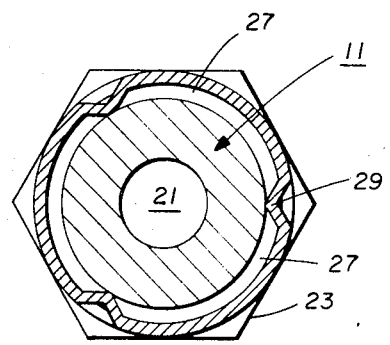
FIG. 4
INVENTOR
RICHARD H. WETTERHORN
ATTORNEY United States Patent Office 3,702,141
Patented Nov. 7, 1972

3,702,141
GAS TYPE SAFETY VALVE
Richard H. Wetterhorn, Fairfield, Conn., assignor to Dresser Industries, Inc., Dallas, Tex.
Filed Feb. 22, 1971, Ser. No. 117,480
Int. Cl. F16k 17/30
U.S. Cl. 137—469
14 Claims

ABSTRACT OF THE DISCLOSURE

A gas type safety valve having controlled force lift characteristics. Discharge ports of predetermined area configuration provide effective discharge pressure drops that are caused to vary as a function of operating set pressure. Varying the discharge pressure drop in this manner utilizes a balance of dynamic flow forces for achieving a pressure controlled blowdown. Operative pressure ranges of individual spring components previously characterized by limited range suitability are thereby extended over a wide range of set pressures and spring rates.

BACKGROUND OF THE INVENTION (1) The field of art to which the invention pertains includes the art of "Fluid Handling" contained in Patent Office Class 137 as particularly directed to "Line Condition Change Responsive Valves" providing for relief of system over-pressure.

(2) The use of safety and/or relief valves in general for relief of system overpressure are well known and are widely used. A variety of safety codes govern and require use of this type valve on an exhaustible variety of installations in which failure to otherwise relieve overpressure would pose a serious hazard to personal injury and/or property damage.

One such type valve is marketed for gas pressure service (frequently air) for use with air compressors, air receivers, gas lines, hydrogen, propane, carbon dioxide, etc. Exemplifying commercially available safety valves of this type is that disclosed in U.S. Pat. 2,641,278. Typically these valves are characteristically regarded as low cost, high production items being of about one inch diameter, up to about 4 inches in overall length with inlet connection of about up to ½ inch nominal pipe size. Being relatively inexpensive and marketed in face of fierce commercial competition, the valves in comparison to similar purpose valves as for example utilized with steam generating boilers, are afforded a minimum of features by which to enhance performance or vary operating limits beyond narrow ranges initially built into the device.

Like in most safety valves, inlet pressure is opposed by a spring force tending to keep the valve closed and which must be overcome before the valve will open for discharge of overpressure. At the same time these valves are required to operate within a controlled blowdown range (percent pressure difference over pop pressure at which reseating occurs) which in a highly cost conscious construction has been difficult to maintain at low valves without incurring chatter, simmer, or other undesirable performance problems. Consequently, high blowdown on the order of about 20–40% is tolerated, and this combination of operating standards has resulted in a highly limited spring choice selection for spring characteristics operable within a given pressure range. That is, each spring has a finite operating range as a result of which a multiplicity of available springs of different spring rates are required from which to choose in order to cover complete operating set pressure ranges with which these valves are used. Once assembled with a spring of predetermined rated capacity, the available set pressures at which the valve can be set and/or operated becomes severely limited. While recognizing the commercial handicaps of such an arrangement, it has not been known heretofore how to resolve the problem and maintain constant blowdown over a large operating range without the necessity of physically changing springs. Obviously, this method of dealing with the problem is very costly. One approach toward resolving the problem is disclosed in U.S. 3,487,852.

SUMMARY

This invention relates to a novel gas type safety valve having controlled force lift characteristics. More particularly, the invention relates to a gas type safety valve which in its post-assembly state is capable of enjoying a substantially wider range of selected operating set-pressures than has been previously possible on an individual per unit basis. Such a result is achieved in accordance herewith by a discharge port configuration effectively enabling pressure control over operating characteristics as a correlated function of operating set pressure. Not only is the settable operating range of these valves significantly increased over that previously known, but by this construction a long standing problem has been resolved without incurring added manufacturing costs.

It is therefore an object of the invention to provide a novel gas type safety valve.

It is a further object of the invention to provide a novel gas type safety valve having improved anti-simmer operating characteristics.

It is a further object of the invention to provide a novel gas type safety valve having controlled force lift characteristics as to enhance operating performance as compared to such similar purpose valves of the prior art.

It is a further object of the invention to provide a novel gas type safety valve which with the same operating components has a significantly increased range of operative pressure settings as compared to similar purpose valves of the prior art.

It is a further object of the invention to provide a novel gas type safety valve requiring a substantially fewer quantity of spring rate choices in order to fullfill the complete operative set-pressure ranges of such valves.

It is a further object of the invention to provide a novel gas type safety valve affording blowdown control independent of spring rate.

It is a still further object of the invention to provide a novel gas type safety valve to effect results as in the aforesaid objects in an economical manner not adversely affecting the manufacturing cost of such valves.

BRIEF DESCRIPTION OF THE DRAWINGS

FIG. 1 is an elevation view of the valve in accordance herewith;

FIG. 2 is a view similar to FIG. 1 but partially in section for illustrating the relationship of components in valve closed position;

FIG. 3 is a fragmentary view similar to FIG. 2 but showing the interior components in the valve open position;

FIG. 4 is a sectional view taken substantially along the lines 4—4 of FIG. 2;

Referring now to FIGS. 1-6 of the drawings the valve hereof designated 10, is comprised of the usual components including an axial extending tubular main body section 11 to which at its upper end is attached a cylindrical bonnet forming cover 12 enclosing a poppet disc 13 being urged downwardly into a seating, valve-closed relation by a compressed coil spring 14. A ring 20 secured extending through the upper end of poppet disc 13 permits manual valve actuation when desired.

Figure 5:
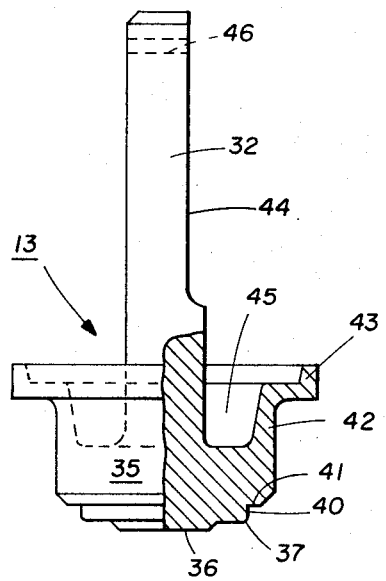
FIG. 5 is an elevation view partially in section of the poppet disc.

Body 11 is of cast aluminum, brass or the like and comprises a tubular section defining an axially central passage 21 extending from an inlet 28 at which to receive gas from a system with which the valve is to be utilized. Inlet end 28 is threaded at 22 for screwing into a prepared tapped opening of the receiving system and for which a wrench or the like can be applied to wrench flats 23. The upper body end, providing outlet 26, is enlarged to define a poppet seating area in the form of an annular chamfer 24 merging into a counterbore 25 and in turn merging into an outward chamfer 34 at outlet end face 38. At or near the body outlet its exterior is either annularly recessed as shown at 27 in FIG. 2 or is threaded as shown dashed at 27' in FIG. 3 for attaching bonnet cover 12 thereto as will be described.

Bonnet 12 comprises a cylindrical centrally and bottom open sleeve of aluminum, brass or the like for axially enveloping poppet 13 and spring 14 and is adapted to be secured to body 11 as by staking 29 to body recess 27 or by threading via threads 27'. Top bonnet end 30 is generally closed except for a central key shaped aperture 31 through which to receive the upper shank portion 32 of poppet disc 13. Axially extending and angularly displaced uniformly about the cylindrical surface of bonnet 12 are a plurality of relief discharge ports 33 of predetermined configuration as will be more specifically described below. In a preferred embodiment, four (4) such ports 33 are employed displaced on about 90 degree centers.

Poppet disc 13 is unitary in construction comprised of a molded plastic such as nylon or the like having a body portion 35 and a radially extending under face 36 adapted for exposure to inlet system pressure in passage 21. Face 36 includes flutes 39 and terminates at a rounded shoulder-like corner 37 comprising an annular seat for engaging annular body chamfer 24 in effecting valve closure when exposed to inlet system pressures of values below that at which the valve is set to operate. An axial shoulder 40, communicating with annular radial surface 41 forms a primary huddle chamber against which relieving gas reacts in effecting poppet liftoff. Axially annular surface 42, merging with the underside of radial end flange 43 defines a secondary huddle chamber for further gas reaction to aid in poppet liftoff. Extending upward from body 35 is a central shank 32 key shaped along surface 44 for cooperating with bonnet opening 31. Shank 32 with axial flange 43 defines an annular cavity 45 therebetween in which to receive the lower end of compressed coil spring 14. A radial aperture 46 at the upper end of shank 32 accommodates ring 20.

Coil spring 14 is appropriately selected of a desired spring rate to accommodate valve operation for the system in which it is to be employed and is contained compressed coiled about shank 32 between lower cavity 45 and the under top surface of bonnet top 30. As will be understood from discussion below, blowdown operation in accordance with a design of the instant invention is independent of the selected spring rate of spring 14.

During assembly of the above components bonnet cover 12 is urged or drawn downward onto main body 11 to a desired axial extent in compressing spring 14. As is conventional, the degree of coil compression is dependent on the required downward force against poppet 13 to offset a contemplated upward gas force corresponding to the set operating pressure in inlet passage 21. The greater the set pressure, the greater the downward imposed force and consequently the greater the downwardly drawn axial overlap of bonnet 12 onto body 11. When desired spring force has been imposed against spring 14 for the set pressure at which the valve is to be operative, bonnet 12 is V-staked at 29 into recess 27 for providing a permanently secured tamper-proof relation therebetween or alternatively is screw threaded onto thread 27' until a similar spring compression force is achieved.

Conventional operation of the valve, as thus far described, is by inlet pressure reacting against poppet face 36 to provide an upward pressure offset by the downward force exerted by compressed spring 14. When inlet pressure reacting upwardly exceeds the downward force of spring 14, poppet 13 begins to move upwardly to lift corner seat 37 and expose the primary huddle chamber at face 41 to inlet pressure. This provides an increased pressure exposed radial surface area to accelerate liftoff, the effect of which is compounded as inlet pressure is exposed to the secondary huddle chamber afforded by axial flange 42 and the underface of radial flange 43. On exposing inlet pressure to the latter, complete poppet lift occurs as it moves from the closed relation of FIG. 2 to the open relation of FIG. 3 enabling discharge of inlet gas outward through ports 33 until over-pressure has been completely relieved to atmosphere. So long as the valve remains open, relieving gas continues to discharge outward through discharge ports 33. Occurring concomitantly with discharge and initiated with inlet exposure to the secondary huddle is a buildup of back pressure in bonnet chamber 51 from gas leakage past the axial surface periphery of flange 43 through a clearance 47 circumferentially intermediate ports 33. The magnitude of back pressure is of course a function of set pressure at the time of release. Back pressure in chamber 51 together with the force exerted by spring 14 constantly urge the lifted poppet downward for returning it to its seating relation. When downward force exceeds upward force, reseating occurs until the next occasion requiring over-pressure to be relieved.

It can be appreciated from the above description that radial clearance 47 between the radial periphery of axial flange 43 and the inside surface of bonnet cover 12 is to a large degree critical for avoiding valve chatter. The clearance must be sufficient to prevent binding against the cover during both liftoff and seating as likely occurs from effects of moisture and/or differential thermal expansion. At the same time both underside and topside flange area provide pressure reacting surfaces for liftoff and closure respectively while clearance 47 essentially regulates the buildup rate and magnitude of backpressure affecting blowdown characteristics of the valve. That is, increasing clearance 47 has the effect of increasing the level of back pressure in chamber 51 while decreasing the level of gas pressure reacting against the secondary huddle chamber. A net closing force results altering ultimate blowdown. By way of example for appreciating criticality of clearance 47, a 0.001 inch decrease (about 0.125 percent) increased blowdown from about 15.5 percent to about 33 percent while an increase in a like amount produced an unstable valve.

Figure 7:
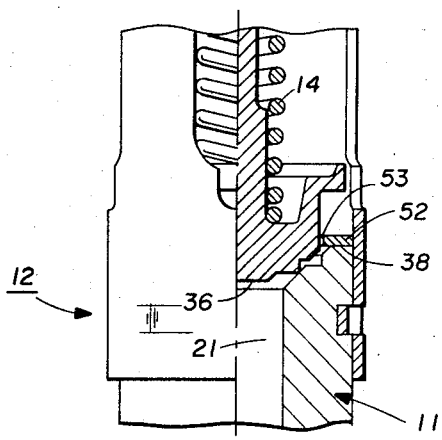
FIGS. 7 and 8 represent modified forms of the valve construction illustrated in FIG. 2.
Figure 6:
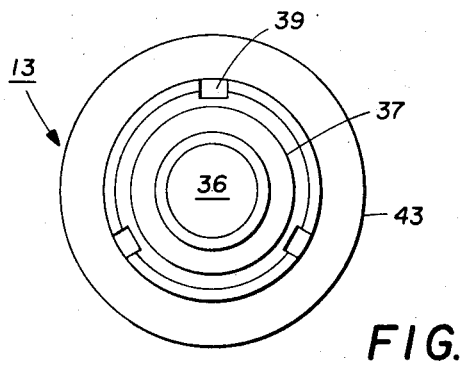
FIG. 6 is a bottom end view of the poppet disc of FIG. 5.
Figure 8:
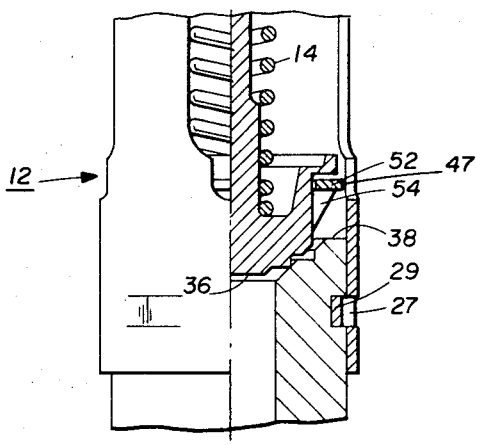
Figure 9:
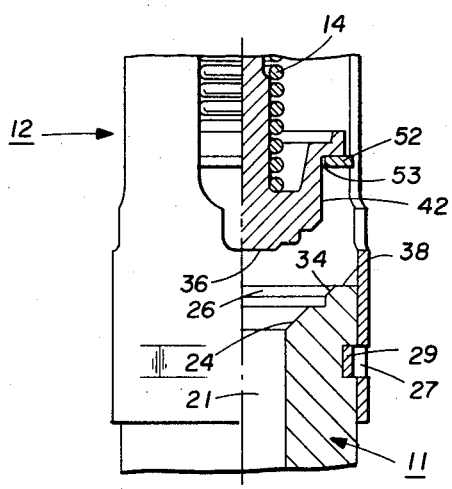
FIG. 9 is a view similar to FIG. 3 for illustrating an open valve relation for the modifications of FIGS. 7 and 8.

For overcoming the impasse dilemma associated with radial clearance 47, the embodiments of FIGS. 7-9 provide a floating annular washer 52 having a central aperture 53 encircling poppet disc body 35. The washer is of aluminum or the like as to be unaffected by moisture. Manufactured tolerances for washer clearance relative to cover 12 can be maintained close while being of a material having the same or nearly the same linear coefficient of thermal expansion as cover 12. During closed valve position, in the embodiment of FIG. 7, washer 52 rests on annular body end facing 38. As the poppet cracks open in beginning its move toward full lift, escaping gas pressure reacting upwardly on the undersurface of washer 52 induces a rapid floating lift thereof into engagement with the underside of flange 43 to provide an accelerated impact against the poppet upward to full life position. Such an arrangement has been found to avoid criticality of radial clearance 47 between the axial flange surface and cover 12. At the same time, by a more compatible material selection the dimensional instability occasioned by moisture or relatively different thermal expansions is overcome. Moreover, it provides an inertia effect which accelerates liftoff to full liftoff position within a reduced liftoff time period as to act as an anti-simmer device, i.e., eliminate hissing at incipient liftoff. Instead of simmering, initial pressure in the primary huddle chamber is absorbed by washer 52 for impact against flange 43. This renders flange 43 diameter less critical than before in controlling blowdown which can now be regulated by washer 52 diameter.

The embodiment shown on FIG. 8 is similar in principle to that of FIG. 7 except the travel extent of washer 52 is reduced by supporting the washer at its underside on a plurality of individual shelf members 54 generally displaced uniformly radially extending about the axial surface of poppet body 35.

Figure 10:
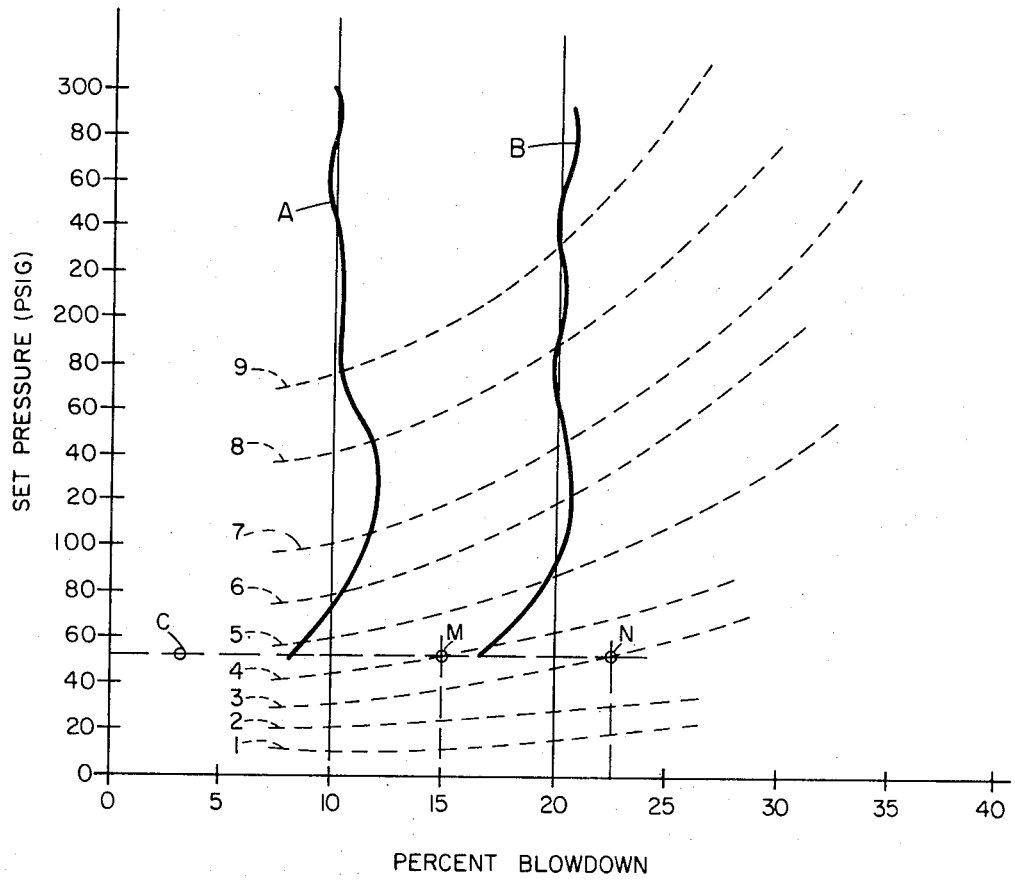
FIGS. 10, 11 and 12 are performance graphs.
Figure 12:
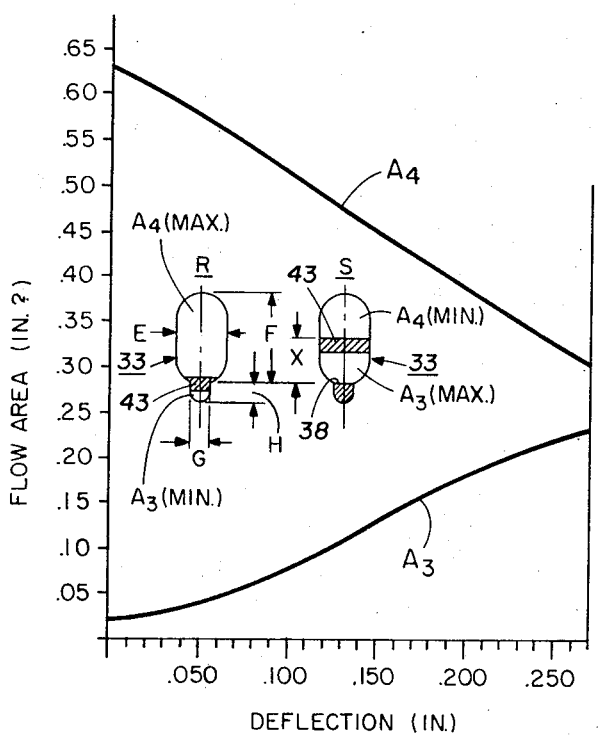

Further appreciation of the invention relative to pressure controlled force lift afforded by means of pressure drop control through discharge ports 33 will now be described with specific reference to the graph information shown in FIGS. 10, 11 and 12. In FIG. 10 each of curves 1–9, shown dashed, represent a family of spring curves from which selection was made in accordance wtih prior art practice for maintaining a pre-established blowdown. In appreciating the significance of these curves it should be born in mind that for each spring, required liftoff force to raise poppet 13 a predetermined distance is constant but that available liftoff force decreases with the square of decrease in set pressure at which the valve is to operate. Conversely, available lift force will increase with the square of increase in set pressure at which the valve is to operate. By way of example for understanding prior art spring selection with use of curves 1–9, dashed line C illustrates spring slection for a set pressure of 50 p.s.i.g. It can be seen that for this operating condition a spring of curve 4 provides 15% blowdown while a spring of curve 3 provides 22½ % blowdown. An 80 p.s.i.g. set pressure for example, will similarly intersect spring curves 6 and 5. By contrast, the pressure control design in accordance with the invention enables operating spring characteristics in the manner of superimposed curves A and B which as can be seen are more nearly vertically linear in maintaining a nearly constant blowdown over an increasingly wide range of set pressures.

Figure 11:
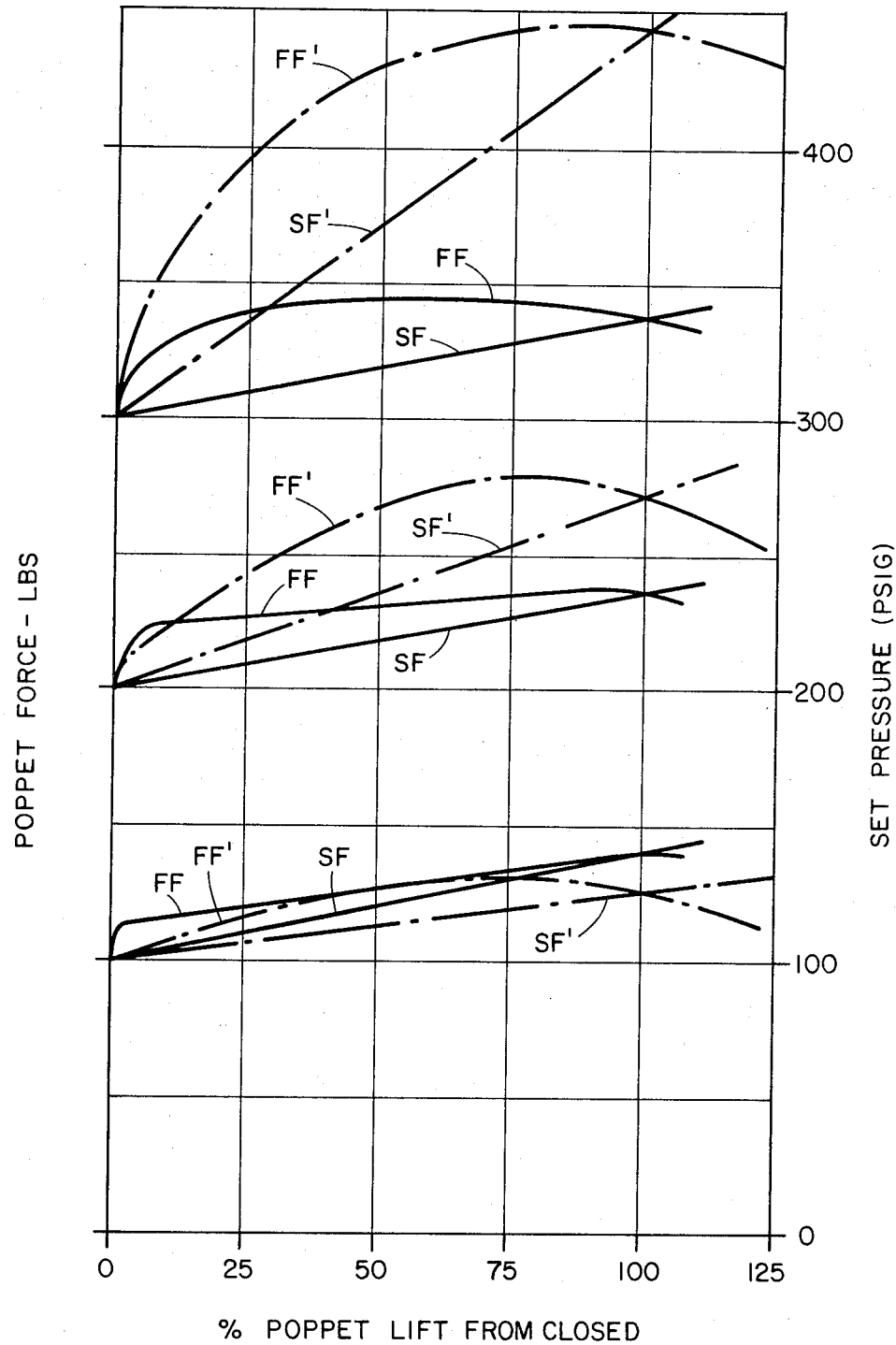

The force lift operating relationships of fluid force and spring force are illustrated in FIG. 11 for operating set pressures of 100, 200 and 300 p.s.i.g. Prior art relationships are graphed in dashed lines for fluid force and spring force designated FF' and SF' respectively whereas relationships in accordance with the instant invention are graphed in solid line and similarly designated FF and SF respectively. From a comparison of these curves it can be readily seen that the spring rate for SF is generally constant for all set pressures whereas SF' increases with set pressure to offset FF' which increases with the square of set pressure. Also the spring rate for SF is generally but not always lower than the spring rates for SF'.

In accordance herewith curves A and B of FIG. 10 represent performance with springs of the same spring rate with clearance 47 being varied to obtain the respective desired differences in blowdown. The substantial linearity of curves A and B as well as FF and SF lift curves of FIG. 11 are effected by control of the dynamic forces acting on poppet 13 throughout its operating ranges in a manner to maintain these forces substantially constant. For an understanding of this force control, reference is also made to FIG. 12. Consider each port 33 flow area radially opposite the underside of flange 43 for discharging the gas stream escaping through outlet 26 to be $A_3$ and the port flow area radially opposite the topside of flange 43 relating to back pressure in chamber 51 to be $A_4$ with diagrams R and S representing deflection contrast at minimum and maximum set pressures respectively. Bearing in mind that the initial axial relation of ports 33 to flnage 43 when poppet 13 is in closed relation varies with set pressure and that lift is constant, the effect of discharge area change vs. set pressure for the entire valve operating range can be readily comprehended. The difference in relative deflection (linear compression of spring 14) between minimum (about 15 p.s.i.g.) and maximum (about 300 p.s.i.g.) set pressures is represented by the dimension X. It can be seen by comparing diagrams R and S that forming ports 33 of two connected part-ovals, the larger upper one having a width E and a length F and the smaller lower one having a width G and a length H, the flow areas $A_4/A_3$ at minimum set pressures is in the ratio of about 20:1 and at maximum set pressure is approaching unity. By controlling effective flow area in this manner a compensative pressure differential is obtained which is effective to control the dynamic force relation between back pressure discharging principally through $A_4$ and inlet line pressure discharging principally through $A_3$. In this manner the pressure differential across $A_3$ and $A_4$ of ports 33 are compensatingly varied as a correlated function of operating set pressure.

In a preferred embodiment from which curves A and B were derived, four ports 33 were empirically derived each of which had the following approximate dimensions:

|   | Inch |
|---|------|
| E | 5/16 |
| F | 37/64 |
| G | 7/64 |
| H | 7/64 |

It is intended however, that none of the given port quantities, geometric shapes, or dimensions are to be considered limitations of the invention.

In the above description there has been disclosed a novel gas type safety valve apparatus capable of superior performance and significantly greater operating set-pressure ranges per unit valve as compared to such similar purpose valves of the prior art. By means of a novel floating washer construction, the previous problems associated with clearance control between the poppet flange and surrounding bonnet cover has been substantially if not completely eliminated in a manner to avoid the blowdown variations and poppet binding previously experienced. By means of a novel discharge port construction hereof providing controlled flow area variations and consequent pressure differentials as a function of set pressure affording a pressure control of poppet 13, blowdown is maintained substantially constant independent of spring rate. Whereas blowdown control in accordance with the prior art is by spring selection for which a plurality of springs are required to cover the operating range of the valve, it can be achieved in accordance herewith by the simplicity of balancing dynamic forces acting against the poppet in combination with but a single closure spring.

Since many changes could be made in the above construction and many apparently widely different embodiments of this invention could be made without departing from the scope thereof, it is intended that all matter contained in the drawings and specification shall be interpreted as illustrative and not in a limiting sense.

The embodiments of the invention in which an exclusive property or privilege is claimed are defined as follows:

1. In a gas type safety valve for relief of system overpressure comprising in combination:
   (a) a tubular valve body defining a gas passage between an inlet and an outlet;
   (b) a poppet disc operative between first and second positions for respectively closing and opening said body passage to gas flow discharge in relief of overpressure;

(c) spring means acting against said poppet disc urging the disc toward said first position in opposition to gas pressure in said passage inlet urging the disc toward said second position, said spring means exerting a predetermined force against said disc that is variably presettable as a function of operating set pressure at which said disc is to move from said first to said second position;

(d) bonnet means surrounding said poppet disc forming a back pressure chamber in which back pressure when present in said chamber assists said spring means in urging the disc toward said first position; and (e) preset control means operatively effective for maintaining substantially constant blowdown through a range of operating set pressures at which said spring means is presettable.

2. In a gas type safety valve according to claim 1 in which said control means operatively compensates the dynamic flow forces reacting against said disc for maintaining said substantially constant blowdown independent of the spring rate of said spring means.

3. In a gas type safety valve according to claim 1 in which said control means includes means providing relatively controlled pressure differential effectively applied against said disc by varying the relatively opposing back pressure and discharge forces reacting against said disc when said disc is in said second position in correlation with the value of operating set pressure to which said spring means is preset.

4. In a gas type safety valve according to claim 3 in which said control means includes at least one discharge port in said bonnet exposed to both said bonnet back pressure chamber and said body outlet when said disc is in said second position, said at least one discharge port being of predetermined geometric configuration for affording said relatively controlled pressure differential to gas flow discharging therethrough.

5. In a gas type safety valve according to claim 4 in which said bonnet means is substantially cylindrically hollow defining said at least one discharge port in the longitudinal surface thereof.

6. In a gas type safety valve according to claim 5 in which said at least one discharge port comprises a plurality of like discharge ports generally located longitudinally coincident in said bonnet surface angularly displaced from each other.

7. In a gas type safety valve according to claim 6 in which the open flow areas of said discharge ports relatively exposed to both said bonnet back pressure chamber and said body outlet effectively provide said relatively controlled pressure differential.

8. In a gas type safety valve according to claim 7 in which the relative exposed areas of said discharge ports varies non-linearly from minimum set pressure to maximum set pressure at which said disc can be cause to move from said first to said second position.

9. In a gas type safety valve according to claim 8 in which said bonnet is secured onto said valve body longitudinally overlapping the outlet thereof, and the relative area exposure of said discharge ports is presettably governed by the linear extent of said longitudinal overlap.

10. In a gas type safety valve according to claim 9 in which the ratio of port area exposure of said back pressure chamber to said body outlet varies decreasingly to maximum set pressure from at least 15 to 1 at minimum set pressure.

11. In a gas type safety valve for relief of system over-pressure comprising in combination:

(a) a tubular valve body defining a gas passage between an inlet and an outlet;

(b) an annular poppet disc operative between first and second positions for respectively closing and opening said body passage to gas flow in relief of over-pressure;

(c) spring means acting against said poppet disc urging the disc toward said first position in opposition to gas pressure in said passage inlet urging the disc toward said second position;

(d) bonnet means closely surrounding said poppet disc in a uniform clearance relation for receiving said disc in said second position and forming a back pressure chamber in which back pressure when present in said chamber assists said spring means in urging the disc toward said first position; and (e) regulating means for presetting the radial clearance between said disc and said bonnet as said disc moves from said first to said second position to effectively regulate the back pressure buildup rate in said back pressure chamber.

12. In a gas type safety valve according to claim 11 in which said poppet disc includes an annular flange the diameter of which defines a uniform radical spacing relative to said bonnet and said regulating means comprises an annular member coaxially underlying said flange and of a diameter greater than said flange.

13. In a gas type safety valve according to claim 12 in which said annular member comprises a washer-like unit loosely mounted onto said disc for axially floating relative thereto in response to gas flow from said body outlet.

14. In a gas type safety valve according to claim 13 in which said annular member generally overlies said body outlet when said disc is in said first position and is responsive to opening of said outlet for relief of overpressure to axially impact against said flange to aid movement of said disc toward said second position.

References Cited

UNITED STATES PATENTS

| 1,189,687 | 7/1916 | Hall | 137—472 |
| 2,502,279 | 3/1950 | Rood | 137—469 |
| 2,295,931 | 9/1942 | Caminez | 137—543.23 |
| 461,149 | 10/1891 | Fogel | 137—474 |
| 2,754,842 | 7/1956 | Hagiwara | 137—474 X |
| 338,827 | 3/1886 | Coale | 137—478 |
| 1,952,646 | 3/1934 | Ackermann | 137—472 X |
| 3,074,425 | 1/1963 | Kikendall | 137—477 |

HAROLD W. WEAKLEY, Primary Examiner

U.S. Cl. X.R.

137—542, 543.23